(12) United States Patent
Dowd

(10) Patent No.: US 9,174,426 B1
(45) Date of Patent: Nov. 3, 2015

(54) METHOD OF MANUFACTURING A SHROUDED CENTRIFUGAL IMPELLER FOR HIGH SPEED USE

(75) Inventor: Adam R. Dowd, Stuart, FL (US)

(73) Assignee: Florida Turbine Technologies, Inc., Jupiter, FL (US)

(*) Notice: Subject to any disclaimer, the term of this patent is extended or adjusted under 35 U.S.C. 154(b) by 805 days.

(21) Appl. No.: 13/412,989

(22) Filed: Mar. 6, 2012

(51) Int. Cl.
*B23K 9/00* (2006.01)
*B33Y 10/00* (2015.01)

(52) U.S. Cl.
CPC ................................ *B33Y 10/00* (2014.12)

(58) Field of Classification Search
CPC .......... B23P 13/00; B23P 15/02; B23P 15/04; B23P 15/08
USPC .............................. 29/23.51, 557, 889, 889.3; 219/121.11–121.14, 121.16, 121.17, 219/121.63, 121.64; 416/179, 182, 185, 416/186 R, 189
See application file for complete search history.

(56) References Cited

U.S. PATENT DOCUMENTS

| 7,687,021 B2 * | 3/2010 | Imbourg et al. .................... 419/8 |
| 2007/0023403 A1 * | 2/2007 | Emiljanow ............... 219/121.64 |
| 2007/0157999 A1 * | 7/2007 | Werner et al. ................. 148/327 |
| 2009/0252606 A1 * | 10/2009 | Jahnen ....................... 415/208.1 |

* cited by examiner

*Primary Examiner* — Dana Ross
*Assistant Examiner* — Brandon Harvey
(74) *Attorney, Agent, or Firm* — John Ryznic

(57) ABSTRACT

An apparatus and a process for producing a shrouded centrifugal impeller where a rear hub opening is machined into the stock material so that hard to reach surfaces in the enclosed passages can be machined. When the hard to reach passages are machined to a final stage, the rear hub opening is closed using a process such as electron beam melting or electron beam welding to enclose the passages and form a single piece shrouded impeller.

6 Claims, 4 Drawing Sheets

METHOD OF MANUFACTURING A SHROUDED CENTRIFUGAL IMPELLER FOR HIGH SPEED USE

CROSS-REFERENCE TO RELATED APPLICATIONS

None.

GOVERNMENT LICENSE RIGHTS

None.

BACKGROUND OF THE INVENTION

1. Field of the Invention

The present invention relates generally to a shrouded centrifugal impeller, and more specifically to a shrouded impeller with a short axial distance and a high radial blade twist.

2. Description of the Related Art Including Information Disclosed Under 37 CFR 1.97 and 1.98

Shrouded centrifugal impellers are used in rocket engines to produce high pressures in the liquids being pumped to the combustion chambers. The rocket engine efficiency can be increased by using higher pressures. Higher pump pressures can be produced with higher rotational speeds of the centrifugal impeller. Prior art manufacturing techniques limit the rotational speeds of these centrifugal impellers, and therefore limit the efficiencies.

Shrouded impellers have an axial inlet with a radial outlet with separate fluid passages formed between the blades from the inlet end to the outlet end. Shrouded impellers have historically been difficult to manufacture. Prior art shrouded impellers have been manufactured in which the shrouds are brazed on after the blades and passages have been machined from a stock material. In this process, a separate formed shroud is brazed to the blades to form the enclosed passages. In a brazed centrifugal impeller, the brazed locations are not 100% covered and therefore leakage occurs. Also, the brazed shroud is not strong enough for high speed use of the speeds to produce the higher pressures required for increased rocket engine performance.

BRIEF SUMMARY OF THE INVENTION

A shrouded centrifugal impeller is formed from a stock material by machining most of the easy to reach surfaces into the stock material and forming a rear hub opening so that the hard to reach surfaces can be machined through the opening. The forward shroud is machined with a thicker wall than required for the finished shroud in order to provide stiffness to the blades and shroud during the machining process. After the rear hub has been enclosed, the forward shroud is machined to its final thickness. Prior to forming the enclosed rear hub, the semi-finished shrouded impeller is heated to near its melting temperature to ensure strong bonds with the material added to form the rear hub enclosure.

DETAILED DESCRIPTION OF THE INVENTION

The present invention is a shrouded centrifugal impeller having a short axial distance and a high radial blade twist and a method for making the shrouded impeller. The shrouded impeller is intended for use in a rocket engine turbo-pump that will be capable of very high rotational speeds in order to increase the efficiency of the rocket engine and to lower the weight of the turbo-pump. A rotational speed of around 72,000 rpm is in this range.

Figure 1:
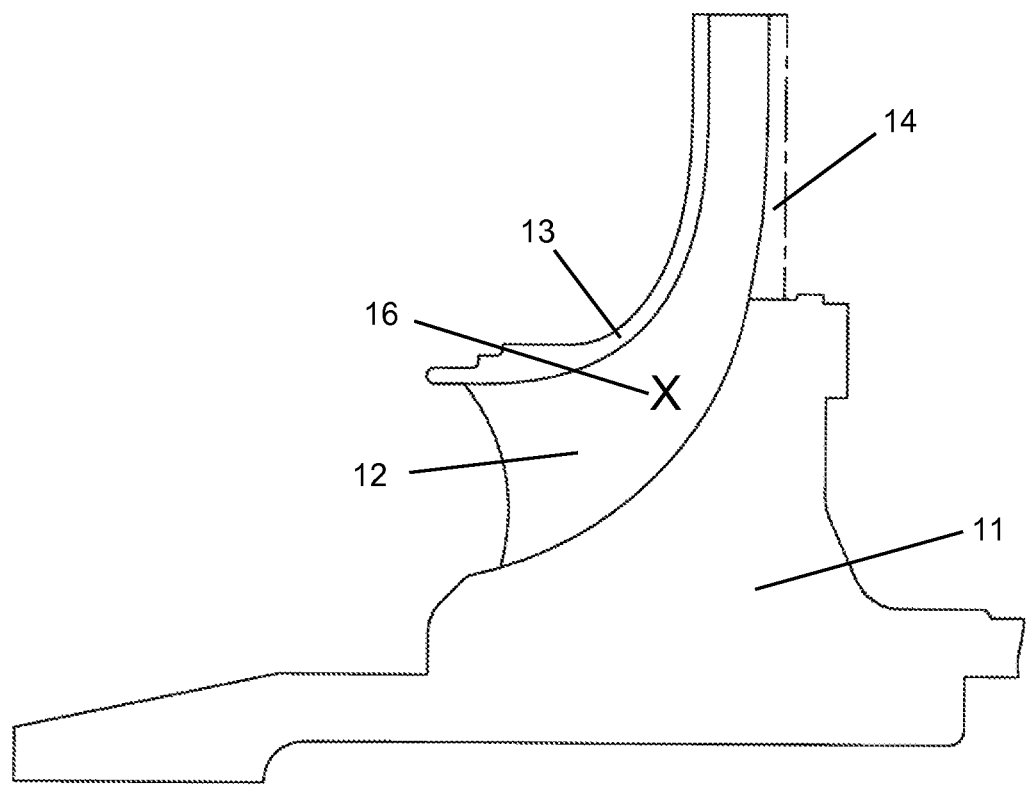
FIG. 1 shows a cross section side view of the shrouded impeller of the present invention with the rear hub open.

FIG. 1 shows a cross section side view of the shrouded impeller of the present invention with a rotor disk 11, a blade 12 having a short axial distance and a high radial blade twist, and a shroud 13 that encloses the blades and form the separate passages that extend from an axial inlet to a radial outlet of the impeller. FIG. 1 shows a rear hub 14 of the impeller open. The impeller with the blades are machined from a stock material with the rear hub open so that the blades and passages having the short axial distance and the high radial blade twist can be machined through the open axial inlets and the rear open hub. Without the rear open hub 14, these blades cannot be machined from the available spaces. For a high speed impeller in a rocket engine that pumps a cryogenic liquid, the stock material would be titanium. Nickels and steel could also be used.

Figure 2:
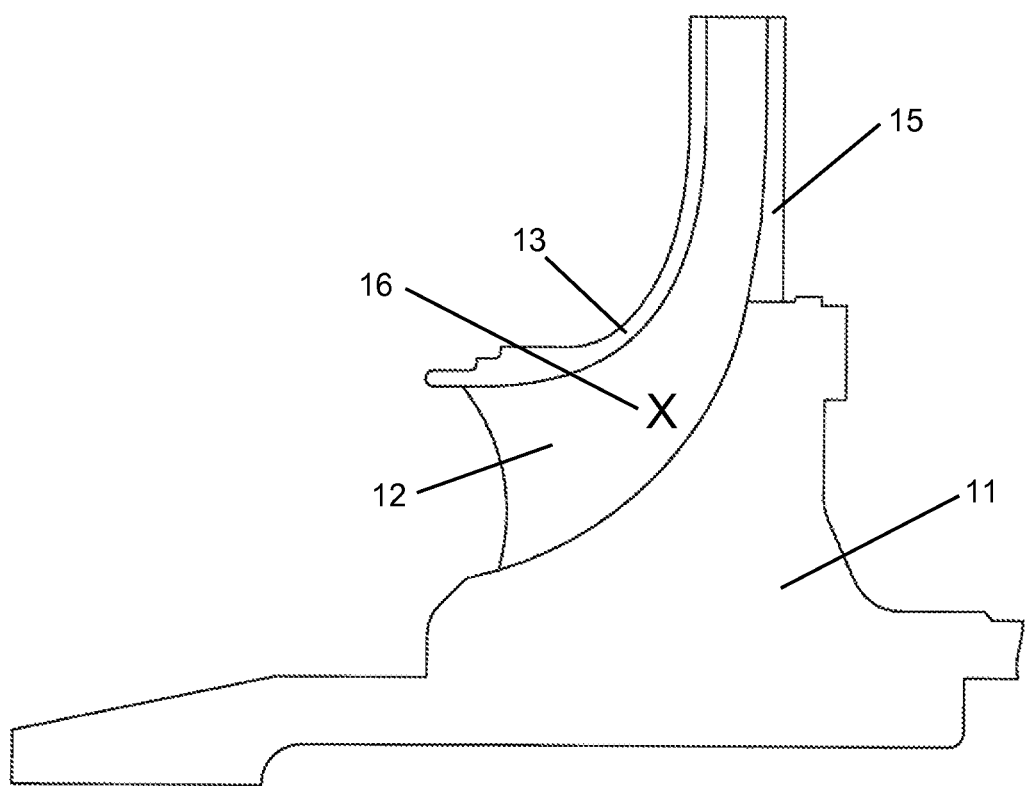
FIG. 2 shows a cross section side view of the shrouded impeller of the present invention with the rear hub closed.
Figure 3:
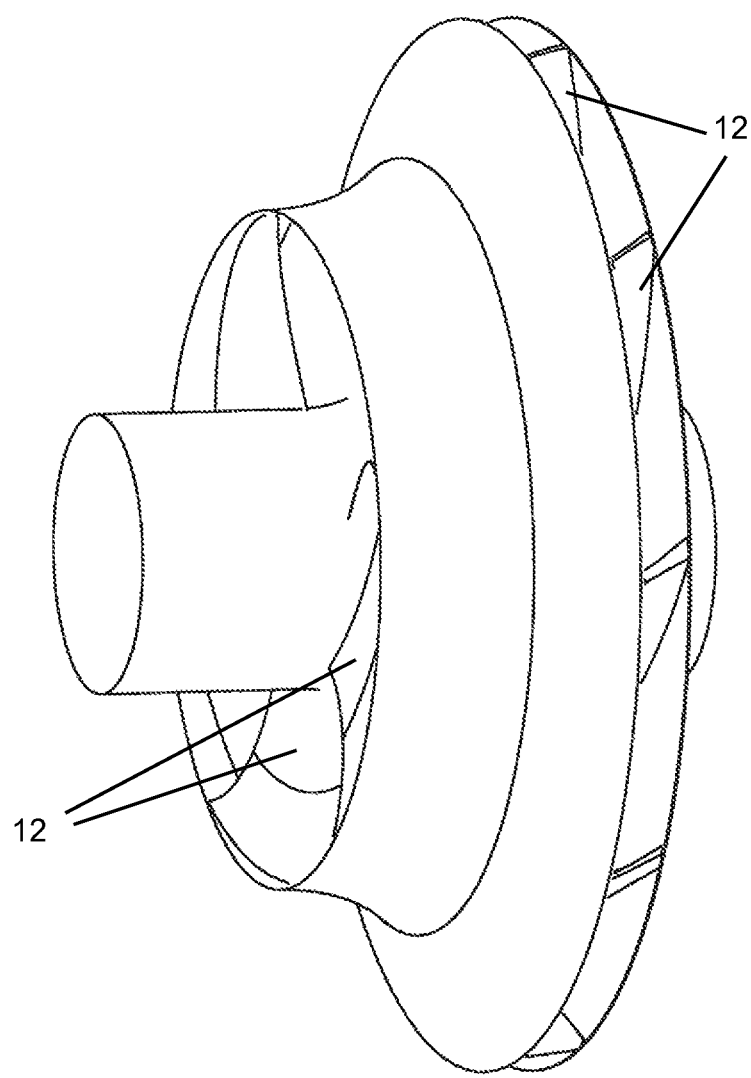
FIG. 3 shows an isometric view of the shrouded impeller of the present invention with an axial inlet and radial outlets.
Figure 4:
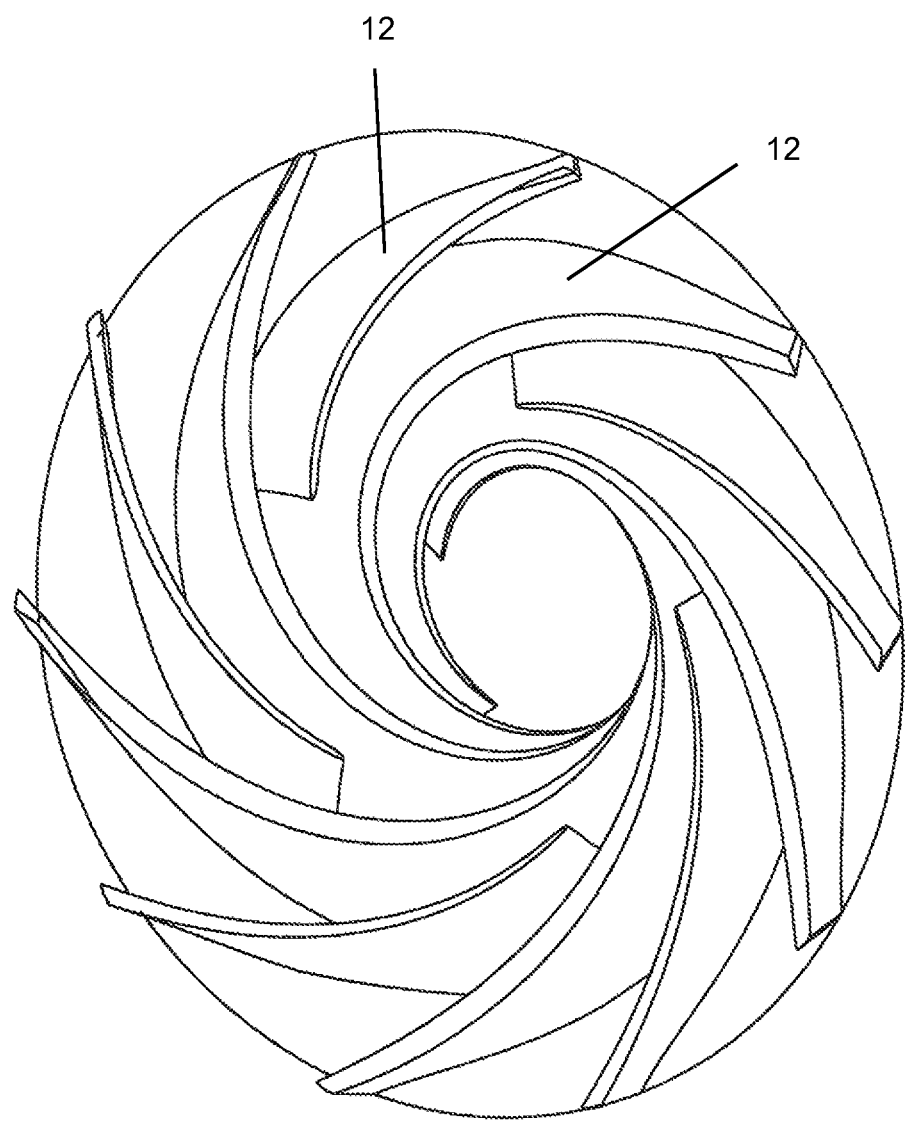
FIG. 4 shows a front view of the shrouded impeller of the present invention with the shroud removed and showing the high radial twist blades.

When the impeller with the blades and the rear open hub have been machined, the rear open hub 14 is closed by forming the hub 15 on the impeller using a process such as EBM (electron beam melting) or EBW (electron beam welding) or other material additive manufacturing to form the complete and single piece shrouded impeller. To produce this shrouded impeller, the blades will be machined into the material with an oversize in the axial direction and will be partially consumed by the EBM or EBW process of forming the rear hub 15. FIG. 2 shows the shrouded impeller with the rear hub formed over the opening 14.

To form the shrouded impeller, a block of material is used for the initial machining. However, the starting material could be a semi-cast impeller having as much of the final shape for the impeller that could not be formed by machining. The block of material is then machined so that the forward side and the aft side of the shrouded impeller are formed as much as possible with the rear hub open 14. The inlet opening and the blades are machined with the forward shroud 13 formed to enclose the passages formed between the blades. The forward shroud 13 is initially machined with a thicker wall than would be required for the finished forward shroud in order to provide high stiffness for the blades and forward shroud during the machining process. After the passages and blades have been formed and the rear hub 15 has been added, the forward shroud is machined again down to the final thickness. The location 16 identified in FIGS. 1 and 2 would be nearly impossible to reach to with a machine tool to cut the blades and passages without the use of the rear hub opening 14. The aft end of the blades would extend into the space where the rear hub opening 14 is located and forms surfaces on which the material to be added later to form the rear hub 15. The EBM or EBW process is then used to form the rear hub 15 in the opening 14 and enclose the passages and form the finished shrouded impeller.

The method of forming the shrouded impeller of the present invention will produce a shrouded impeller with no leakage between the blades and the shroud and thus result in an increase in performance. For a high performance rocket engine, the shrouded impeller would be formed from a material such as titanium which has a high strength to weight ratio. To form the shrouded impeller, the impeller with the rear open hub 14 should be formed from a fine grain structure for both the impeller and the rear hub 15 that will be formed on the opening 14. To weld the rear hub 15 over the opening, a slow weld with a thin weld wire of from 0.010 to 0.020 inches in diameter should be used. Also, the impeller should be heated to near the melt temperature during the welding process to enclose the rear opening 14 with the rear hub 15. With the welded rear hub enclosing the blades and passages, a strong weld is produced that will enable the very high rotational speeds required for the higher impeller performance and pressures.

I claim the following:

1. A method of manufacturing a high speed shrouded centrifugal impeller for a rocket engine, comprising the steps of:
   machining from a stock material a centrifugal impeller with blades and a forward shroud and a rear hub opening as a single piece;
   form a rear hub using an additive material manufacturing process to enclose the centrifugal impeller and form a complete centrifugal impeller as a single piece.

2. The method of manufacturing a high speed shrouded impeller of claim 1, and further comprising the steps of:
   machining the forward shroud with an oversized thickness in order to provide high stiffness for the blades and forward shroud during the machining process; and,
   machining the forward shroud down to a desired thickness.

3. The method of manufacturing a high speed shrouded impeller of claim 1, and further comprising the steps of:
   machining the blades each with an axial extension extending into a space formed by the rear hub opening; and,
   forming the rear hub over the axial extensions.

4. The method of manufacturing a high speed shrouded impeller of claim 1, and further comprising the step of:
   the material additive manufacturing process is electron beam melting or electron beam welding.

5. The method of manufacturing a high speed shrouded impeller of claim 1, and further comprising the step of:
   the step of enclosing the rear hub opening includes welding the material to form the rear hub with weld wire.

6. The method of manufacturing a high speed shrouded impeller of claim 1, and further comprising the step of:
   the step of forming a rear hub using an additive material manufacturing process includes rotating the impeller while welding a wire strand of metal material around the rear hub opening.

* * * * *